(12) United States Patent
Kim

(10) Patent No.: US 8,873,514 B2
(45) Date of Patent: Oct. 28, 2014

(54) METHOD AND APPARATUS FOR DOWN LINK INTERFERENCE CANCELATION BETWEEN ADJACENT BASE STATIONS IN BASE STATION WITH RECONFIGURABLE ANTENNA

(75) Inventor: Byung-Ki Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 394 days.

(21) Appl. No.: 13/397,836

(22) Filed: Feb. 16, 2012

(65) Prior Publication Data

US 2012/0207048 A1  Aug. 16, 2012

(30) Foreign Application Priority Data

Feb. 16, 2011  (KR) ................. 10-2011-0013574

(51) Int. Cl.
 *H04W 4/00* (2009.01)
 *H04W 72/08* (2009.01)
 *H04W 16/28* (2009.01)
(52) U.S. Cl.
 CPC ............ *H04W 72/082* (2013.01); *H04W 16/28* (2013.01)
 USPC ........................................................ 370/332
(58) Field of Classification Search
 USPC ........................... 370/252, 332, 334
 See application file for complete search history.

(56) References Cited

U.S. PATENT DOCUMENTS

| 8,385,900 B2 * | 2/2013 | Trigui ........................ 455/418 |
|---|---|---|
| 2005/0141412 A1 | 6/2005 | Sadri et al. |
| 2005/0164664 A1 | 7/2005 | DiFonzo et al. |
| 2006/0222101 A1 | 10/2006 | Cetiner et al. |
| 2008/0009321 A1 | 1/2008 | Sayeed et al. |
| 2009/0010316 A1 | 1/2009 | Rofougaran |
| 2009/0146894 A1 | 6/2009 | Drexler et al. |
| 2009/0146895 A1 | 6/2009 | Drexler et al. |
| 2009/0209212 A1 | 8/2009 | Cetiner et al. |
| 2009/0312057 A1 | 12/2009 | Moon et al. |

* cited by examiner

*Primary Examiner* — Mohammad Anwar
(74) *Attorney, Agent, or Firm* — Jefferson IP Law, LLP

(57) ABSTRACT

A transmit antenna pattern is provided. A method for determining the transmit antenna pattern includes determining first Signal to Interference and Noise Power Ratios (SINRs) of a first mobile station and a second mobile station based on first Channel Quality Indicator (CQI) values received from a first base station and a second base station in the first operation when a transmit antenna pattern of the first base station is fixed and a transmit antenna pattern of the second base station is changed, determining second SINRs of the first mobile station and the second mobile station based on second CQI values received from the first base station and the second base station when the transmit antenna pattern of the first base station is changed and the transmit antenna pattern of the second base station is changed, and determining a transmit antenna pattern exhibiting the best performance based on the determined SINRs.

26 Claims, 7 Drawing Sheets

METHOD AND APPARATUS FOR DOWN LINK INTERFERENCE CANCELATION BETWEEN ADJACENT BASE STATIONS IN BASE STATION WITH RECONFIGURABLE ANTENNA

PRIORITY

This application claims the benefit under 35 U.S.C. §119(a) to a Korean patent application filed in the Korean Intellectual Property Office on Feb. 16, 2011, and assigned Serial No. 10-2011-0013574, the entire disclosure of which is hereby incorporated by reference.

BACKGROUND OF THE INVENTION

1. Field of the Invention

The present invention relates to a base station. More particularly, the present invention relates to a method and an apparatus for canceling downlink interference between adjacent base stations in a base station which uses a reconfigurable antenna.

2. Description of the Related Art

In Wireless-Fidelity (Wi-Fi), M-Worldwide Interoperability for Microwave Access (WiMAX), and Long Term Evolution (LTE) systems, demand for compact and femto base stations to increase indoor data communication capacity is growing.

In an indoor propagation environment, efficient solutions for facilitating installation of the base station or an access point and operating a wireless network are desired. Disadvantageously, antennas of a fixed radiation pattern or fixed polarization exhibit optimum performance only at a particular installation location or under a particular channel condition.

When a plurality of base stations using the same frequency band is adjacent to one another in the indoor propagation environment, downlink performance is limited mainly by interference between the base stations.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for canceling downlink interference between adjacent base stations in a base station using a reconfigurable antenna.

Another aspect of the present invention is to provide a method and an apparatus for canceling downlink interference between adjacent base stations when two or more base stations use a reconfigurable antenna with interference between adjacent base stations using the same frequency band in a mobile communication system.

In accordance with an aspect of the present invention, a method of a network device for determining a transmit antenna pattern in a mobile communication system is provided. The method includes requesting a first base station to fix a transmit antenna pattern and requesting a second base station to change a transmit antenna pattern, determining first Signal to Interference and Noise Power Ratios (SINRs) of a first mobile station and a second mobile station based on first Channel Quality Indicator (CQI) values received from the first base station and the second base station when the first base station has the fixed transmit antenna pattern and the second base station has the changed transmit antenna pattern, requesting the first base station to change the transmit antenna pattern and requesting the second base station to fix the transmit antenna pattern, determining second SINRs of the first mobile station and the second mobile station based on second CQI values received from the first base station and the second base station when the first base station has the changed transmit antenna pattern and the second base station has the fixed transmit antenna pattern, and determining a transmit antenna pattern exhibiting the best performance based on the determined first and second SINRs.

In accordance with another aspect of the present invention, a method of a base station for determining a transmit antenna pattern in a mobile communication system is provided. The method includes determining to fix a transmit antenna pattern and requesting a particular base station to change a transmit antenna pattern, determining first SINRs of a first mobile station and a second mobile station based on first CQI values received when the transmit antenna pattern is fixed and the particular base station's transmit antenna pattern is changed, determining to change the transmit antenna pattern and requesting the particular base station to fix the transmit antenna pattern, determining second SINRs of the first mobile station and the second mobile station based on second CQI values received when the transmit antenna pattern is changed and the particular base station's transmit antenna pattern is fixed, and determining a transmit antenna pattern exhibiting the best performance based on the determined first and second SINRs.

In accordance with another aspect of the present invention, a network device for determining a transmit antenna pattern in a mobile communication system is provided. The network device includes a communication interface for communicating with a first base station and a second base station, and a controller for requesting the first base station to fix a transmit antenna pattern, for requesting the second base station to change a transmit antenna pattern, for determining first SINRs of a first mobile station and a second mobile station based on first CQI values received from the first base station and the second base station when the transmit antenna pattern of the first base station is fixed and the transmit antenna pattern of the second base station is changed, for requesting the first base station to change the transmit antenna pattern, for requesting the second base station to fix the transmit antenna pattern, for determining second SINRs of the first mobile station and the second mobile station based on second CQI values received from the first base station and the second base station when the transmit antenna pattern of the first base station is changed and the transmit antenna pattern of the second base station is fixed, and for determining a transmit antenna pattern exhibiting the best performance based on the determined first and second SINRs.

In accordance with still another aspect of the present invention, an apparatus of a base station for determining a transmit antenna pattern in a mobile communication system is provided. The apparatus includes a backhaul communication part for communicating with other base stations, a reconfigurable antenna scheduler for determining to fix a transmit antenna pattern, for requesting a particular base station to change a transmit antenna pattern, for determining first SINRs of a first mobile station and a second mobile station based on first CQI values received when the transmit antenna pattern is fixed and the particular base station's transmit antenna pattern is changed, for determining to change the transmit antenna pattern, for requesting the particular base station to fix the transmit antenna pattern, for determining second SINRs of the first mobile station and the second mobile station based on second CQI values received when the transmit antenna pattern is changed and the particular base station's transmit antenna pattern is fixed, and for determining a transmit antenna pattern exhibiting the best performance based on the determined first and second SINRs, at least one supply and switch part for adjusting a transmission pattern of an antenna according to the determined transmit antenna pattern, and at least one antenna for radiating a signal according to the determined transmit antenna pattern.

In accordance with another aspect of the present invention, a method for determining a transmit antenna pattern in a mobile communication system is provided. The method includes determining a first SINR difference of a first mobile station and a first SINR difference of a second mobile station when an antenna pattern of a first base station is fixed and an antenna pattern of a second base station is changed, determining a second SINR difference of the first mobile station and a second SINR difference of the second mobile station when the antenna pattern of the first base station is changed and the antenna pattern of the second base station is fixed, selecting an antenna pattern for each of the first and second base stations which maximizes a channel capacity based on the first and second SINR differences, and applying the selected antenna patterns to the first and second base stations.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, determination error, determination accuracy limitations and other factors known to those of skill in the art, may occur in amounts that do not preclude the effect the characteristic was intended to provide.

Exemplary embodiments of the present invention provide a method and an apparatus for canceling downlink interference between adjacent Base Stations (BSs) in a BS using a reconfigurable antenna.

Figure 1:
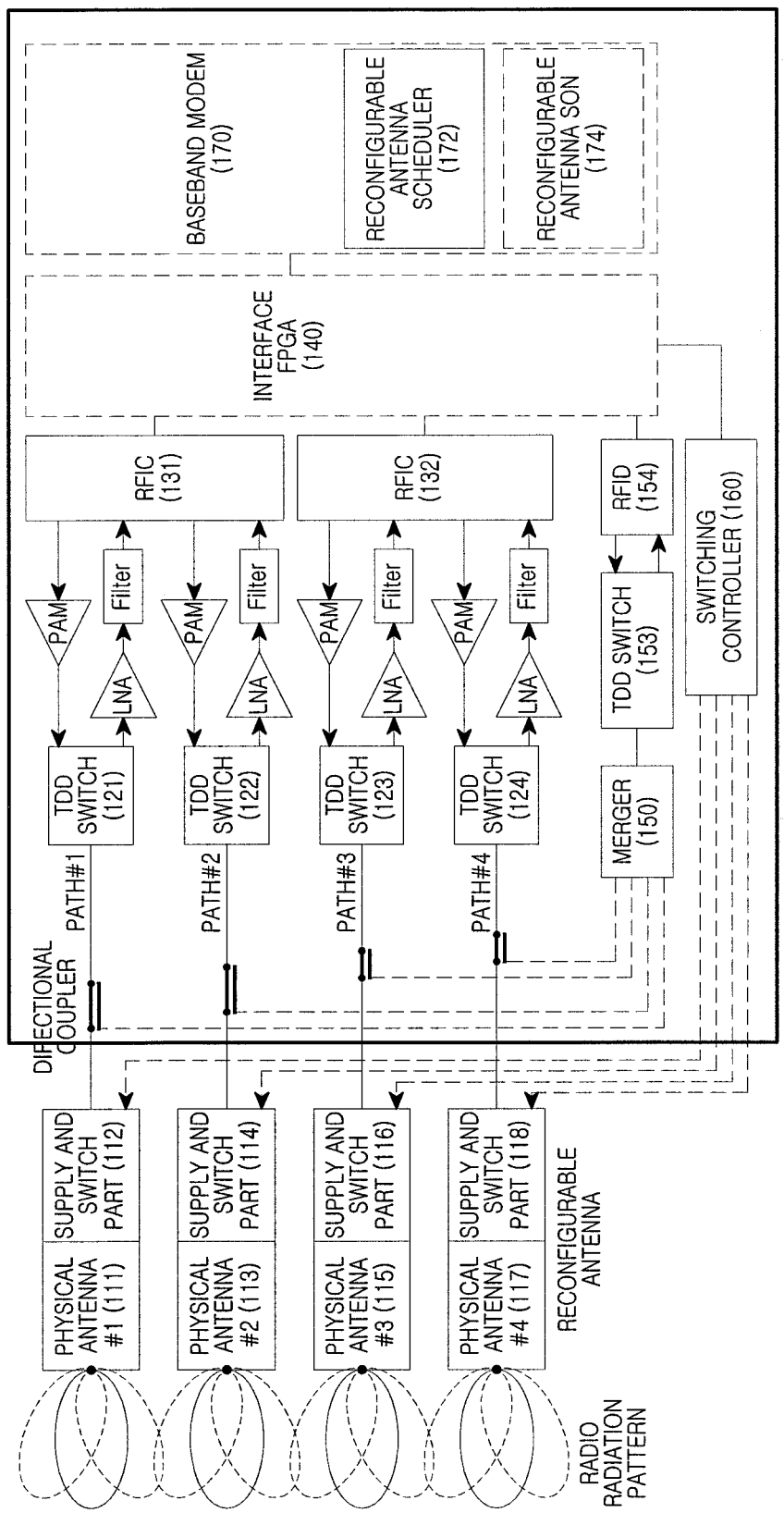
FIG. 1 is a block diagram of a base station including a reconfigurable antenna according to an exemplary embodiment of the present invention.

FIG. 1 is a block diagram of a BS including a reconfigurable antenna according to an exemplary embodiment of the present invention.

Referring to FIG. 1, the BS including the reconfigurable antenna includes a plurality of antennas 111, 113, 115, and 117 for Multiple Input Multiple Output (MIMO).

The antennas 111, 113, 115, and 117 transmit data output from a plurality of supply and switch parts 112, 114, 116, and 118 or provide the received data to the supply and switch parts 112, 114, 116, and 118 according to operations of Time Division Duplex (TDD) switches 121-124.

According to a control signal of a switching controller 160, the supply and switch parts 112, 114, 116, and 118 control the physical antennas 111, 114, 115, and 117 to radiate signals in a radiation pattern of the control signal.

A baseband modem 170 up-converts data transmitted in the higher layer to a Radio Frequency (RF) signal, down-converts an RF signal received over the antenna to a baseband signal, and provides the baseband signal to the higher layer.

In the reception, the signals transmitted over the physical antennas 111, 113, 115, and 117 are fed to the baseband modem 170 via the TDD switches 121-124, a Low Noise Amplifier (LNA), a filter, RF Integrated Circuits (RFICs) 131 and 123, and an interface Field Programmable Gate Array (FPGA) 140. In the transmission, the RF signals are fed to the physical antennas 111, 113, 115, and 117 via the interface FPGA 140, the RFICs 131 and 123, a Power Amplification Module (PAM), and the TDD switches 121-124.

The BS for supporting a beamforming function of a smart antenna may further include a merger 150, an RFID 154, and a TDD switch 153 in order to calibrate relative magnitude and phase differences between RF paths per antenna.

The merger 150 switches on or off a coupler according to a switch signal of the TDD switch 153 via the RFID 154 and thus sends the data or the signal to the supply and switch parts 112 and 118. The merger 150 may select the RF path per antenna to estimate the magnitude and phase differences to calibrate the transmission and the reception.

The baseband modem 170 includes a reconfigurable antenna scheduler 172 and may include a Self Organization Network (SON) 174.

The reconfigurable antenna scheduler 172 may determine an antenna radiation pattern to be used by a Mobile Station (MS) by communicating with other BS. Alternatively, the reconfigurable antenna scheduler 172 may receive the antenna radiation pattern to be used by the MS from a joint BS operation manager of other network entity and apply the corresponding antenna radiation pattern. The BS includes a backhaul communication part for communicating with other BS or other network entity.

Figure 2:
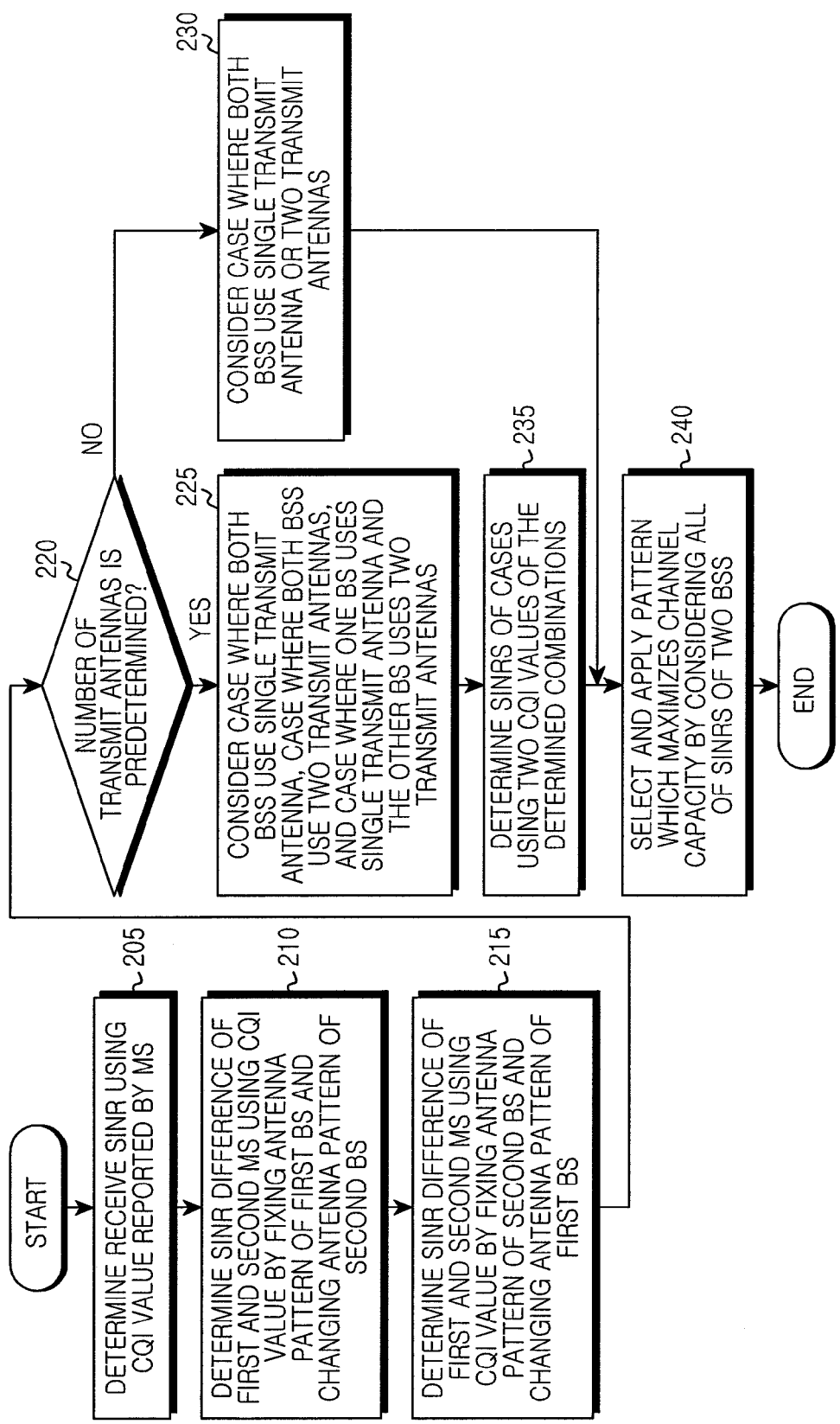
FIG. 2 is a flowchart of operations of a base station including a reconfigurable antenna or a network entity including a joint BS operation manager according to an exemplary embodiment of the present invention.

FIG. 2 is a flowchart of operations of a BS including a reconfigurable antenna or a network entity including a joint BS operation manager according to an exemplary embodiment of the present invention.

Referring to FIG. 2, the BS including the reconfigurable antenna or the joint BS operation manager determines a receive Signal to Interference and Noise Power Ratio (SINR) using a Channel Quality Indicator (CQI) value reported by the MS in step 205. While FIG. 2 is described below with respect to the BS, it would be understood that the operations described with respect to FIG. 2 may be performed by a network entity including the joint BS operation manager. In this case, the joint BS operation manager may receive the CQI value from the BS.

In step 210, the BS determines the SINRs and the SINR difference of first and second MSs using the determined CQI value by fixing the antenna pattern of a first BS and changing the antenna pattern of a second BS.

In step 215, the BS determines the SINRs and the SINR difference of first and second MSs using the determined CQI value by fixing the antenna pattern of the second BS and changing the antenna pattern of the first BS.

When the number of transmit antennas is predetermined in step 220, the BS considers a case where both BSs use a single transmit antenna, a case where both BSs use two transmit antennas, and a case where one BS uses the single transmit antenna and the other BS uses two transmit antennas in step 225.

In step 235, the BS determines SINRs of the cases of step 225 using two CQI values of the combinations determined in step 210 and step 215.

In step 240, the BS selects and applies a pattern which maximizes the channel capacity by taking account of all of the SINRs of the two BSs. When the operations are performed by a network entity, the joint BS operation manager transmits the determined pattern to the BS, and the BS applies the received pattern.

When the number of the transmit antennas is not predetermined in step 220, the BS considers the case where both BSs use a single transmit antenna or both BSs use two transmit antennas in step 230.

In step 235, the BS determines the SINR of the corresponding case of step 230 using two CQI values of the combinations determined in step 210 and step 215.

In step 240, the BS selects and applies a pattern which maximizes the channel capacity by taking account of all of the SINRs of the two BSs. When the operations are performed by a network entity, the joint BS operation manager transmits the determined pattern to the BS, and the BS applies the received pattern.

Exemplary embodiments of the present invention are applicable not only to a TDD wireless communication system but also a Frequency Division Duplex (FDD) wireless communication system. For the FDD wireless communication system, the transmission path is separate from the reception path, instead of the single transmission and reception path using the TDD switch in FIG. 1. The transmission path and the reception path may use different frequency bands.

While one or two transmit antennas are illustrated here by way of example, the number of the transmit antennas may be three or more. For example, when the number of the transmit antennas is four or eight, the BS including the reconfigurable antenna or the joint BS operation manager can consider cases where the two BSs use 1~4 or 1~8 antennas.

Figure 3:
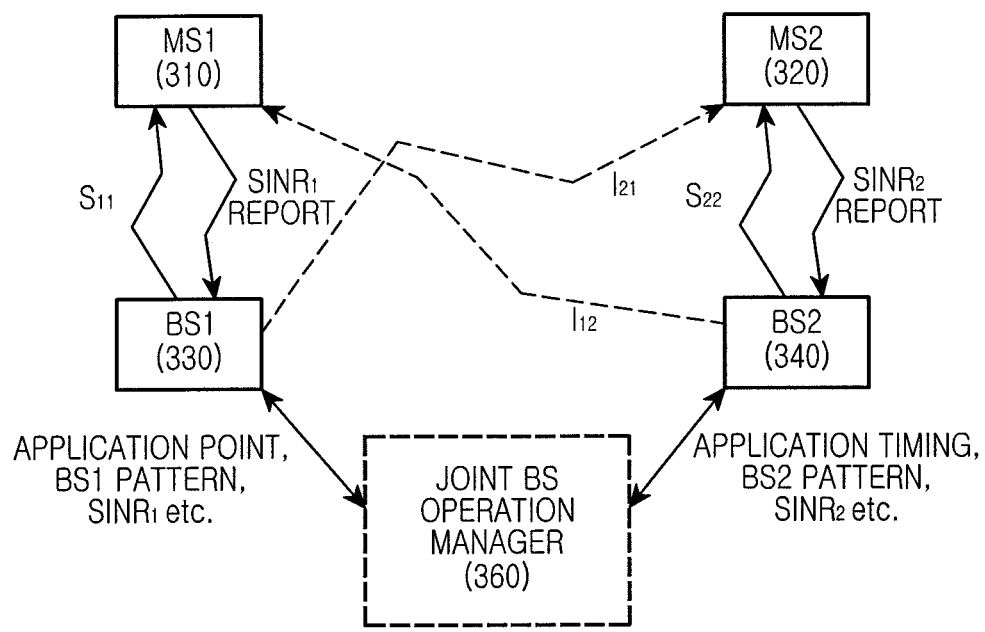
FIG. 3 is a diagram of joint operations of a base station according to an exemplary embodiment of the present invention.

FIG. 3 is a diagram of joint operations of a BS according to an exemplary embodiment of the present invention.

Referring to FIG. 3, a joint BS operation manager 360 determines a pattern number to scan according to the time of the reconfigurable antenna of BSs 330 and 340, and determines an optimum combination among the available antenna pattern combinations by aggregating the SINR values reported from MSs 310 and 320. The joint BS operation manager 360 may be included in the BS, or may be a separate network entity.

When the joint BS operation manager 360 is included in the BS, its functions may be carried out by the reconfigurable antenna scheduler 172. When the joint BS operation manager 360 is included in the BS, it can request other BS to determine and apply the transmit antenna pattern.

When the joint BS operation manager 360 is a separate network entity, the controller may function as the joint BS operation manager 360. The network entity including the joint BS operation manager 360 includes a storage unit for storing necessary data and information when the joint BS operation manager 360 operates, and a communication interface for communicating with other network entity, more particularly, with the BS.

The joint BS operation manager 360 may request the BSs to perform various operations or transmit information to the joint BS operation manager 360. For example, the joint BS operation manager 360 may request the BS to fix or change the transmit antenna pattern, and receive the CQI value or the SINR value in response.

The SINR value of the MS includes 4~8 bits according to the related standard. The joint BS operation manager 360 determines and transmits transmit antenna pattern information to apply for the scanning, to the corresponding BS 330 or 340. The antenna pattern indicates the transmit antenna pattern.

The joint BS operation manager 360 may receive the current transmit antenna pattern (Tx Ant. Pattern) information from the BS 330 or 340. The transmit antenna pattern information is 4-bit information and may represent up to 16 antenna patterns.

Based on the CQI value determined by the MS and reported to the BS, the BS may determine the receive SINR value in the downlink determined by the MS. The downlink receive SINR value has properties of Table 1 according to the communication system.

TABLE 1

| Communication System | Downlink Receive SINR Report characteristics |
|---|---|
| mWiMax | 31 dB range, 1 dB step, SINR −3~28 dB, per every Frame |
| LTE | 4 bits (16 Step, per 2 dB range), per x~xx ms range |
| IEEE 802.11n | CSI Report field, 8 bits, SINR −10 dB to 53.75 dB in 0.25 dB steps |

Figure 4:
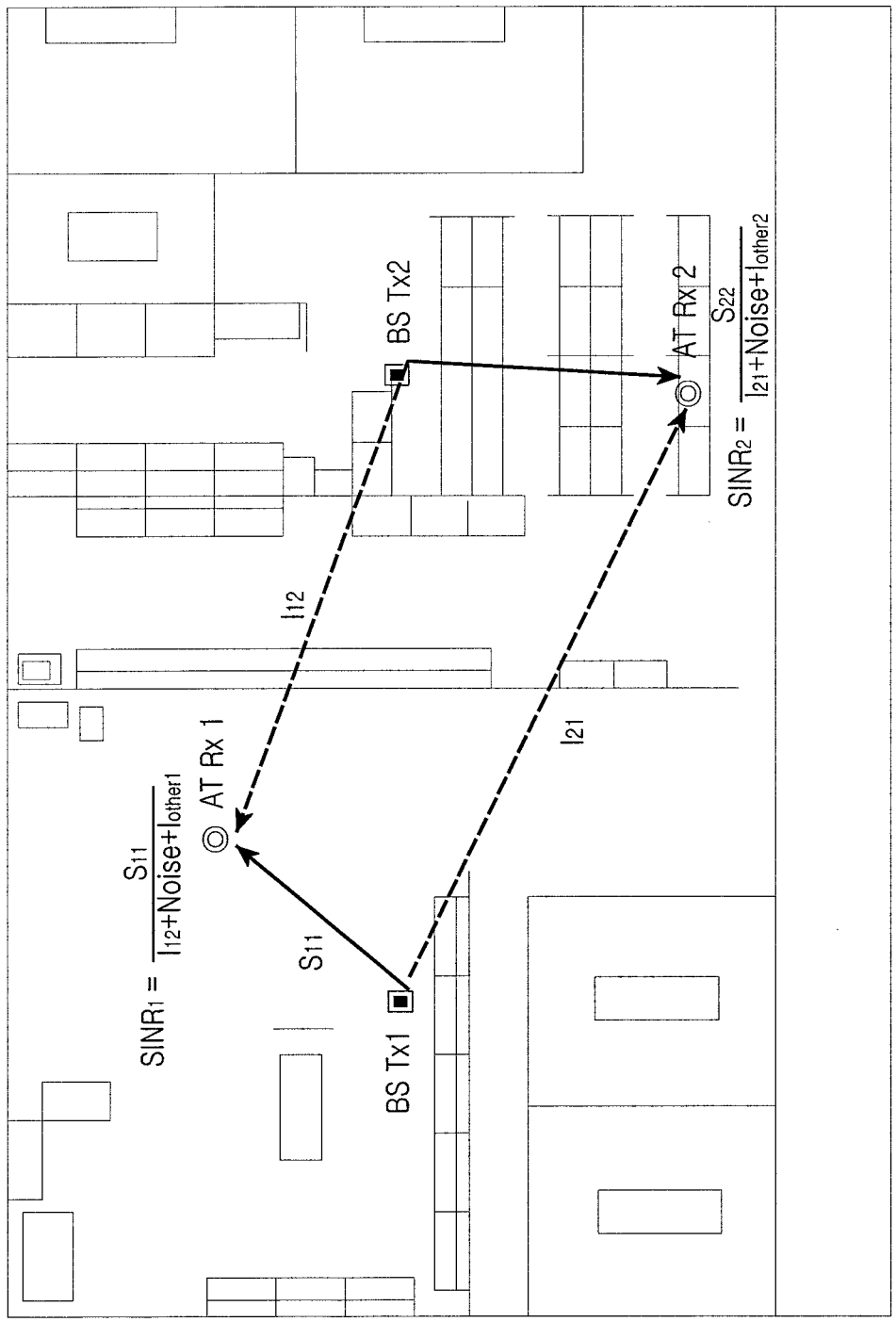
FIG. 4 is a diagram of a Signal to Interference plus Noise Ratio (SINR) relation between multiple base stations and a mobile station in an indoor propagation environment according to an exemplary embodiment of the present invention.

FIG. 4 is a diagram of an SINR relation between multiple BSs and one MS in an indoor propagation environment according to an exemplary embodiment of the present invention.

Referring to FIG. 4, the second BS fixes the reconfigurable antenna pattern (for example, in the first pattern). As changing the reconfigurable antenna pattern set, the first BS monitors the receive SINR difference of the first and second MSs using the CQI value. The antenna pattern indicates the transmit antenna pattern.

The first MS determines the difference of the reconfigurable antenna pattern change of the first BS with the CQI value based on Equation 1.

$$SINR_1 = \frac{S_{11}}{I_{12} + \text{Noise} + I_{other1}} \quad (1)$$

$S_{11}$ denotes a receive signal power of the first MS according to the transmit signal of the first BS, $I_{12}$ denotes an interference signal power of the first MS according to the transmit signal of the second BS, and $I_{other1}$ denotes a receive interference power of the first MS (other BS excluding the first BS and the second BS and other receive interference).

As the antenna pattern of the first BS changes, $S_{11}$ reflects the receive signal power difference from the first BS to the first MS. As for $I_{12}$, the antenna pattern of the second BS is fixed and the interference power of the first MS from the second BS is fixed.

The second MS determines the difference $I_{21}$ of the reconfigurable antenna pattern change of the first BS with the CQI value based on Equation 2.

$$SINR_2 = \frac{S_{22}}{I_{21} + \text{Noise} + I_{other2}} \quad (2)$$

$S_{22}$ denotes a receive signal power of the second MS according to the transmit signal of the second BS, $I_{21}$ denotes an interference signal power of the second MS according to the transmit signal of the first BS, and $I_{other2}$ denotes a receive interference power of the second MS (other BS excluding the first BS and the second BS and other receive interference).

As for $S_{22}$, the antenna pattern of the second BS is fixed and the receive power of the second MS from the second BS is fixed. $I_{21}$ reflects the receive signal power difference of the second MS from the first BS when the transmit pattern of the first BS is changed.

The first BS fixes the reconfigurable antenna pattern (for example, in the first pattern). As changing the reconfigurable antenna pattern set, the second BS monitors the receive SINR difference of the first and second MSs using the CQI value. The antenna pattern indicates the transmit antenna pattern.

The first MS determines the difference $S_{22}$ of the reconfigurable antenna pattern change of the second BS with the CQI value based on Equation 3.

$$SINR_2 = \frac{S_{22}}{I_{21} + \text{Noise} + I_{other2}} \quad (3)$$

$S_{22}$ denotes a receive signal power of the second MS according to the transmit signal of the second BS, $I_{21}$ denotes an interference signal power of the second MS according to the transmit signal of the first BS, and $I_{other2}$ denotes a receive interference power of the second MS (other BS excluding the first BS and the second BS and other receive interference).

$S_{22}$ reflects the receive signal power difference of the second MS from the second BS when the antenna pattern of the second BS is changed. As for $I_{21}$, the antenna pattern of the first BS is fixed and the interference power of the second MS from the first BS is fixed.

The second MS determines the difference $I_{12}$ of the reconfigurable antenna pattern change of the second BS with the CQI value based on Equation 4.

$$SINR_1 = \frac{S_{11}}{I_{12} + \text{Noise} + I_{other1}} \quad (4)$$

$S_{11}$ denotes a receive signal power of the first MS according to the transmit signal of the first BS, $I_{12}$ denotes an interference signal power of the first MS according to the transmit signal of the second BS, and $I_{other1}$ denotes a receive interference power of the first MS (other BS excluding the first BS and the second BS and other receive interference).

As for $S_{11}$, the antenna pattern of the first BS is fixed and the receive power of the first MS from the first BS is fixed. As the transmit pattern of the second BS changes, $I_{12}$ reflects the receive signal power difference of the first MS from the second BS.

Accordingly, $S_{11}$, $S_{22}$, $I_{12}+\text{Noise}+I_{other1}$, and $I_{21}+\text{Noise}+I_{other2}$ of 12 antenna patterns can be estimated.

Figure 5:
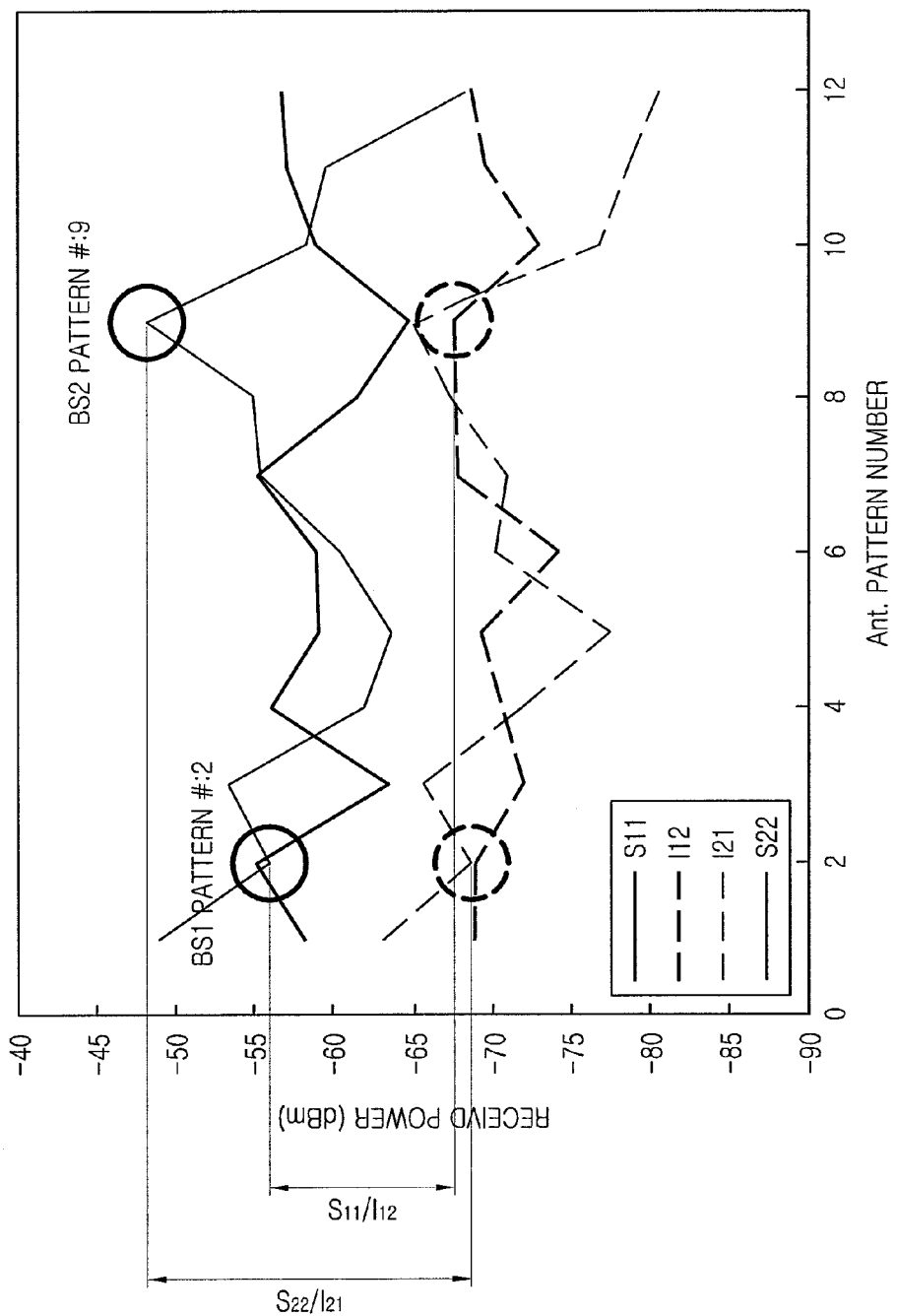
FIG. 5 is a graph of Signal to Interference Ratio (SIR) performance when two base stations using a reconfigurable antenna independently operate according to an exemplary embodiment of the present invention.

FIG. 5 is a graph of SIR performance when two BSs using the reconfigurable antenna independently operate according to an exemplary embodiment of the present invention.

Referring to FIG. 5, the maximum reconfigurable antenna pattern is selected based on only the receive powers $S_{11}$ and $S_{22}$ of the MSs. When the BS1 pattern #2 and the BS2 pattern #9 are applied, the SIR is degraded by the interferences $I_{12}$ and $I_{21}$ of the adjacent BS.

$SINR_1$ and $SINR_2$ for the combinations based on the operation situations of Table 2 are determined using the two CQI values for two BSs×12 patterns=24 combinations determined above. Table 2 shows the number of the reconfigurable antenna pattern combinations in two BSs per operation situation.

TABLE 2

| Case No. | Operation Situation | Pattern combination equation | Combination Number |
|---|---|---|---|
| 1 | 1 antenna transmission by both 2 base stations | 12 × 12 | 144 |
| 2 | 2 antenna transmission by both 2 base stations | 54 × 54 | 2916 |
| 3 | 2 antenna transmission by 1 base station | 12 × 54 | 648 |
| 4 | 1 antenna transmission by both 2 base stations or 2 antenna transmission by both 2 base stations is under consideration | (54 + 12) × (54 + 12) | 4536 |

In Table 2, the cases 1, 2 and 3 first determine whether each BS applies one-antenna transmission or two-antenna transmission, and the case 4 determines whether each BS applies one-antenna transmission or two-antenna transmission after determining all of the combinations.

Case 1 may save the scanning time by partially scanning the 24 pattern combinations and finely scanning only a small number of candidate patterns of clear difference with time using the initial partial scanning result.

The SINR of the two BSs are considered jointly. The pattern for maximizing the determination of the channel capacity of the combinations is selected and applied to each BS. The channel capacity of the two BSs is maximized based on Equation 5.

$$\text{Deter min ation1} = \log_2(1+\text{SINR}_1) + \log_2(1+\text{SINR}_2)$$

$$\text{Dter min ation2} = \text{SINR}_1(dB) + \text{SINR}_2(dB) \quad (5)$$

Deter min ation1 is based on the channel capacity formula of Shannon information theorem. A case that weights can be applied to Equation 5 per user may be considered and the case may be based on Equation 6.

$$\text{Deter min ation3} = \text{weight}_1 \cdot \log_2(1+\text{SINR}_1) + \text{weight}_2 \cdot \log_2(1+\text{SINR}_2)$$

$$\text{Deter min ation4} = \text{weight}_1 \cdot \text{SINR}_1(dB) + \text{weight}_2 \cdot \text{SINR}_2(dB) \quad (6)$$

When $\text{weight}_1=1$ and $\text{weight}_2=0$, only the first MS is considered and the second MS is sacrificed. The weight may vary according to priority of the first MS and the second MS per situation. For example, high weight can be applied to the MS in the cell boundary.

Figure 6:
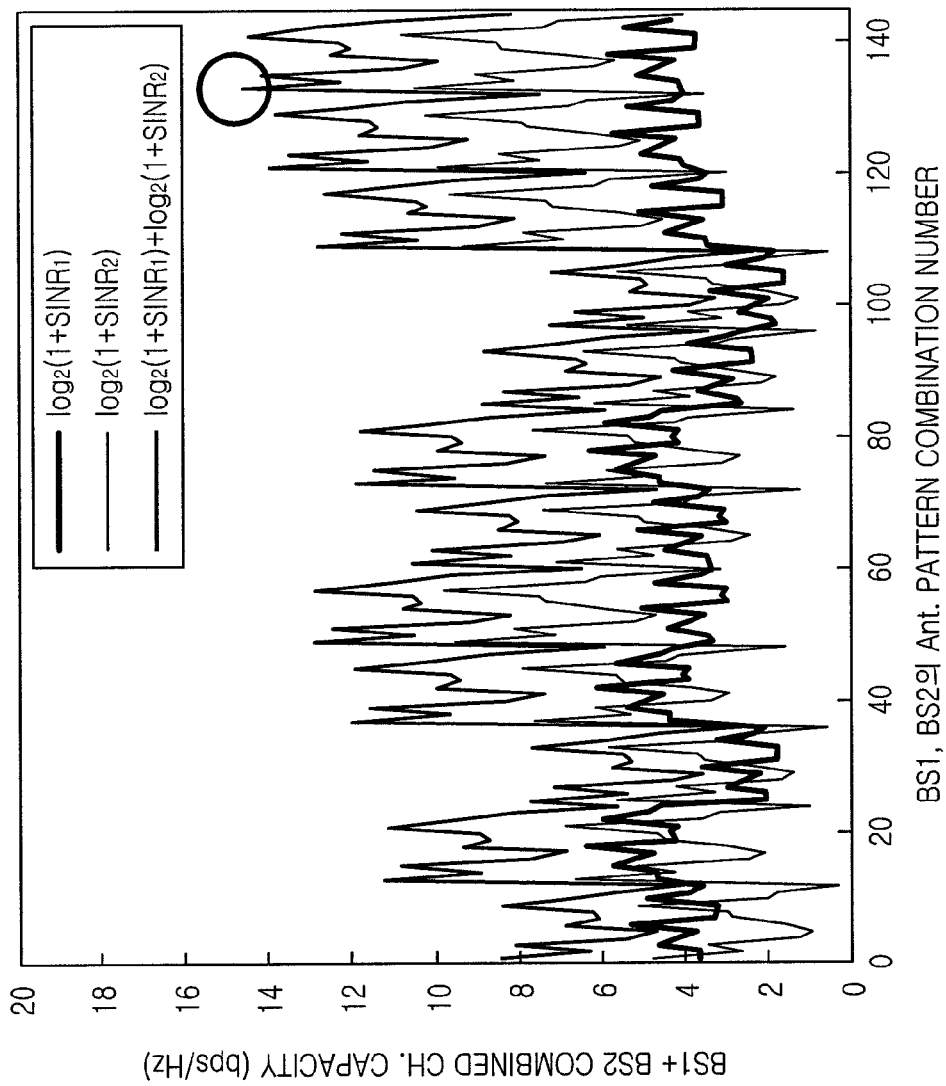
FIG. 6 is a graph of channel capacity for pattern combinations 12×12=144 of one-antenna transmission when two base stations using a reconfigurable antenna jointly operate according to an exemplary embodiment of the present invention.

FIG. 6 is a graph of the channel capacity for pattern combinations 12×12=144 of one antenna transmission when two BSs using the reconfigurable antenna jointly operate according to an exemplary embodiment of the present invention.

Referring to FIG. 6, the combination number is (BS1 pattern #−1)×12+BS2 pattern #, and the joint maximum combination number is 133 and corresponds to BS1 pattern #: 12 and BS2 pattern #: 1.

Figure 7:
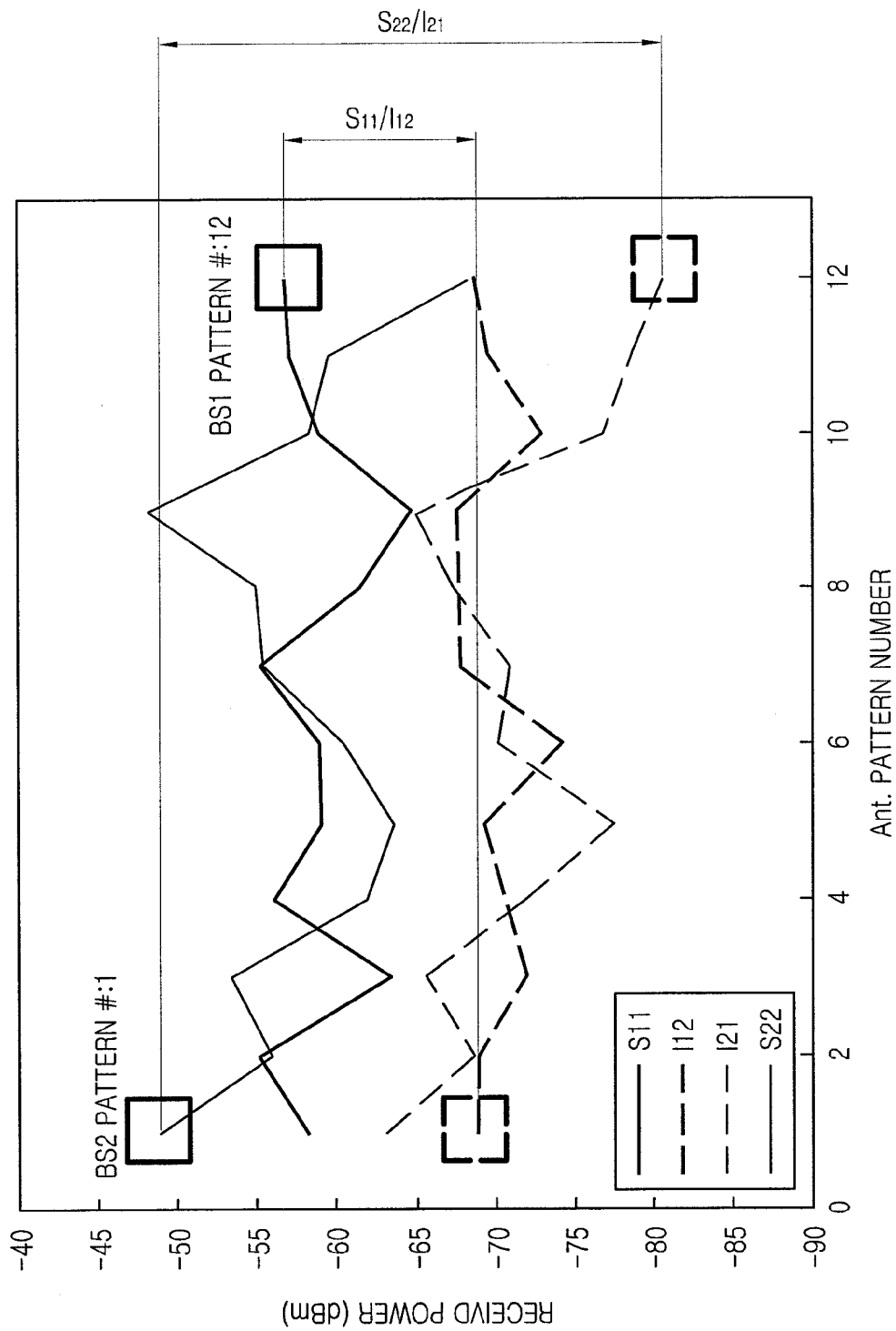
FIG. 7 is a graph of an improved SIR when two base stations using a reconfigurable antenna jointly operate according to an exemplary embodiment of the present invention.

FIG. 7 is a graph of the improved SIR when two base stations using the reconfigurable antenna jointly operate according to an exemplary embodiment of the present invention.

Referring to FIG. 7, BS1 pattern #=12 and BS2 pattern #=1. When the BS1 pattern #12 and the BS2 pattern #1 are applied, the SIR improves the interferences $I_{12}$ and $I_{21}$ of the adjacent BSs.

When the MS supports two or more receive antennas and the MIMO reception function, for the MIMO in the downlink, the BS can use two or more transmit antennas.

If necessary, when switching from the MIMO to Single Input Single Output (SISO), the BS may use the single antenna, rather than the two antennas. When two transmit antennas are employed in the SISO, the BS may transmit the signal over the two transmit antennas by applying Cyclic Delay Diversity (CDD) to the same stream signal.

For the MIMO in the downlink, the BS should use two or more transmit antennas. When the SISO is more advantageous than the MIMO in terms of the performance (data throughput) according to the condition of the MS (for example, when the SINR is low in the cell boundary or the channel condition is not adequate), the BS may transition to a SISO mode.

When $S_{11} \geq I_{12}$ and $S_{22} \geq I_{12}$, i.e., when the power received at the first MS from the first BS is equal to or greater than the interference from the second BS to the first MS or the power received at the second MS from the second BS is equal to or greater than the interference from the second BS to the first MS, the following situations may arise.

When $S_{11} < I_{12}$ in the first MS, i.e., when the power received at the first MS from the first BS is less than the interference from the second BS to the first MS, the first MS should access the second BS, not the first BS.

When $S_{22} < I_{21}$ in the second MS, i.e., when the power received at the second MS from the second BS is less than the interference from the first BS to the second MS, the second MS should access the first BS, not the second BS.

In those cases, similar to the case 4 of Table 2, when both BSs consider the one-antenna transmission or the two-antenna transmission, (54+12)×(54+12)=4356 combinations should be determined and thus a greater time may be consumed with the limited determination capability.

When each BS determines whether to use the single transmit antenna or the two transmit antennas and determines the optimum pattern combination of the available combinations, the determination load can be relieved as in the number of the combinations in the case 1-3 of Table 2.

First, each BS determines whether to use the single transmit antenna or the two transmit antennas in the SISO mode, which is now explained.

When the interference of the adjacent BS using the reconfigurable antenna is greater than $\text{Noise}+I_{other}$, the reception performance is restricted by the interference. Accordingly, it is effective to mitigate the interference by use of the single transmit antenna.

When $I_{12} > \text{Noise}+I_{other1}$ in the first MS, i.e., when great interference is exerted by the second BS, the second BS first uses the single transmit antenna to minimize the interference to the first MS.

When the interference change $I_{12}+\text{Noise}+I_{other1}$ for the first MS is small though the second BS employs the single transmit antenna, the second BS determines to use two transmit antennas.

When $I_{21} > \text{Noise}+I_{other2}$ in the second MS; i.e., when great interference is exerted by the first BS, the first BS first uses the single transmit antenna to minimize the interference to the second MS.

When the interference change $I_{21}+\text{Noise}+I_{other2}$ for the second MS is small though the first BS employs the single transmit antenna, the first BS determines to use two transmit antennas.

When the interference of the adjacent BS using the reconfigurable antenna is less than or similar to $\text{Noise}+I_{other}$, the reception performance is restricted by the noise. As a result, the interference is not greatly improved.

Accordingly, the BS may increase the receive power for the corresponding MS by using two transmit antennas.

When $I_{12} \leq \text{Noise}+I_{other1}$ in the first MS, i.e., when the interference exerted by the second BS is small or similar, the second BS employs two transmit antennas to maximize the receive power $S_{22}$ to the second MS.

When $I_{21} \leq \text{Noise}+I_{other2}$ in the second MS, i.e., when the interference exerted by the first BS is small or similar, the first BS employs two transmit antennas to maximize the receive power $S_{11}$ to the first MS.

As set forth above, the BS including the reconfigurable antenna cooperatively operates, selects the antenna radiation pattern for mitigating the interference, and thus reduces the interference.

While the operations in the TDD wireless communication system has been described above, exemplary embodiments of the present invention are applicable to the FDD wireless communication system and various changes and modifications of the embodiments described herein can be made without departing from the scope and spirit of the invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a network device for determining a transmit antenna pattern in a mobile communication system, the method comprising:
   requesting a first base station to fix a plurality of transmit antenna patterns and requesting a second base station to change a plurality of transmit antenna patterns;
   determining first Signal to Interference and Noise Power Ratios (SINRs) of a first mobile station and a second mobile station based on first Channel Quality Indicator (CQI) values received from the first base station and the second base station;
   determining whether at least one of the plurality of transmit antenna patterns is an interference source for the second base station on the first SINRs;
   requesting the first base station to change the at least one of the plurality of transmit antenna patterns and requesting the second base station to fix the plurality of transmit antenna patterns;
   determining second SINRs of the first mobile station and the second mobile station based on second CQI values received from the first base station and the second base station; and
   determining the plurality of transmit antenna patterns exhibiting the best performance based on the determined first and second SINRs.

2. The method of claim 1, further comprising:
   transmitting information of the determined plurality of transmit antenna patterns to the first base station and the second base station to apply the determined plurality of transmit antenna patterns.

3. The method of claim 1, wherein the determining of the plurality of transmit antenna patterns comprises:
   when the first and second base stations use 1~N antennas, determining the plurality of transmit antenna patterns of the best performance based on an SINR of the best performance based on the first and second CQI values.

4. The method of claim 3, wherein the first and second SINRs determined based on the first and second CQIs are values which maximize channel capacities of the first base station and the second base station.

5. The method of claim 1, wherein the determining of the plurality of transmit antenna patterns comprises:
   when both of the first and second base stations use 1~N antennas, determining the plurality of transmit antenna patterns of the best performance based on an SINR of the best performance based on the first and second CQI values.

6. The method of claim 5, wherein the first and second SINRs determined based on the first and second CQI values are values which maximize channel capacities of the first base station and the second base station.

7. A method of a base station for determining a transmit antenna pattern in a mobile communication system, the method comprising:
   determining to fix a plurality of transmit antenna patterns and requesting a particular base station to change a plurality of transmit antenna patterns;
   determining first Signal to Interference and Noise Power Ratios (SINRs) of the first mobile station and a second mobile station based on first Channel Quality Indicator (CQI) values received;
   determining whether at least one of the plurality of transmit antenna patterns is an interference source for the particular base station based on the first SINRs;
   determining to change the at least one of the plurality of transmit antenna patterns and requesting the particular base station to fix the plurality of transmit antenna patterns;
   determining second SINRs of the first mobile station and the second mobile station based on second CQI values received; and
   determining the plurality of transmit antenna patterns exhibiting a best performance based on the determined first and second SINRs.

8. The method of claim 7, further comprising:
   applying the determined plurality of transmit antenna patterns to the base station and transmitting information of the determined plurality of transmit antenna patterns to the particular base station to apply the determined plurality of transmit antenna patterns.

9. The method of claim 7, wherein the determining of the plurality of transmit antenna patterns comprises:
   when the base station and the particular base station use 1~N antennas, determining the plurality of transmit antenna patterns of the best performance based on an SINR of the best performance based on the first and second CQI values of the first and second mobile stations.

10. The method of claim 9, wherein the first and second SINRs determined based on the first and second CQI values are values which maximize channel capacities of the first base station and the second base station.

11. The method of claim 7, wherein the determining of the plurality of transmit antenna patterns comprises:
    when both of the base station and the particular base station use 1~N antennas, determining the plurality of transmit antenna patterns of the best performance based on an SINR of the best performance based on the first and second CQI values of the first and second mobile stations.

12. The method of claim 11, wherein the first and second SINRs determined based on the first and second CQI values are values which maximize channel capacities of the first base station and the second base station.

13. A network device configured to determine a transmit antenna pattern in a mobile communication system, the network comprising:
    a communication interface configured to communicate with a first base station and a second base station; and
    a controller configured to request the first base station to fix a plurality of transmit antenna patterns, to request the second base station to change a plurality of transmit antenna patterns, to determine first Signal to Interference and Noise Power Ratios (SINRs) of a first mobile station and a second mobile station based on first Channel Quality Indicator (CQI) values received from the first base station and the second base station, to determine whether at least one of the plurality of transmit antenna patterns is an interference source for the second base station based on the first SINRs, to request the first base station to change the at least one of the plurality of transmit antenna patterns, to request the second base station to fix the plurality of transmit antenna patterns, to determine second SINRs of the first mobile station and the second mobile station based on the second CQI values received from the first base station and the second base station, and to determine the plurality of transmit antenna patterns exhibiting the best performance based on the determined first and second SINRs.

14. The network device of claim 13, wherein the controller transmits information of the determined plurality of transmit antenna patterns to the first base station and the second base station to apply the determining plurality of transmit antenna patterns.

15. The network device of claim 13, wherein, when the first and second base stations use 1~N antennas, the controller determines the plurality of transmit antenna patterns of the best performance based on an SINR of the best performance based on the first and second CQI values of the first and second mobile stations.

16. The network device of claim 15, wherein the first and second SINRs determined based on the first and second CQI values are values which maximize channel capacities of the first base station and the second base station.

17. The network device of claim 13, wherein, when both of the first and second base stations use 1~N antennas, the controller determines the plurality of transmit antenna patterns of the best performance based on an SINR of the best performance based on the CQI values of the first and second mobile stations.

18. The network device of claim 17, wherein the first and second SINR determined based on the first and second CQI values are values which maximize channel capacities of the first base station and the second base station.

19. An apparatus of a base station configured to determine a transmit antenna pattern in a mobile communication system, the apparatus comprising:
   a backhaul communication part configured to communicate with other base stations;
   a reconfigurable antenna scheduler configured to determine to fix a plurality of transmit antenna patterns, to request a particular base station to change a plurality of transmit antenna patterns, to determine Signal to Interference and Noise Power Ratios (SINRs) of the first mobile station and the second mobile station based on first Channel Quality Indicator (CQI) values received, to determine whether at least one of the plurality of transmit antenna patterns is an interference source for the second base station based on the first SINRs, to determine to change the at least one of the plurality of transmit antenna patterns, to request the particular base station to fix the plurality of transmit antenna patterns, to determine second SINRs of the first mobile station and the second mobile station based on second CQI values received, and to determine the plurality of transmit antenna patterns exhibiting the best performance based on the determined first and second SINRs;
   at least one supply and switch part for adjusting the plurality of transmission patterns of an antenna according to the determined plurality of transmit antenna patterns; and
   at least one antenna for radiating a signal according to the determined plurality of transmit antenna patterns.

20. The apparatus of claim 19, wherein the reconfigurable antenna scheduler applies the determined plurality of transmit antenna patterns to the base station and transmits information of the determined plurality of transmit antenna patterns to the particular base station through the backhaul communication part to apply the determined plurality of transmit antenna patterns.

21. The apparatus of claim 19, wherein
   when the base station and the particular base station use 1~N antennas, the reconfigurable antenna scheduler determines the plurality of transmit antenna patterns of the best performance based on an SINR of the best performance based on the CQI values of the first and second mobile stations.

22. The apparatus of claim 21, wherein the first and second SINRs determined based on the first and second CQI values are values which maximize channel capacities of the first base station and the second base station.

23. The apparatus of claim 19, wherein
   when both of the base station and the particular base station use 1~N antennas, the reconfigurable antenna scheduler determines the plurality of transmit antenna patterns of the best performance based on an SINR of the best performance based on the CQI values of the first and second mobile stations.

24. The apparatus of claim 23, wherein the first and second SINRs determined based on the first and second CQI values are values which maximize channel capacities of the first base station and the second base station.

25. A method for determining a transmit antenna pattern in a mobile communication system, the method comprising:
   determining a first Signal to Interference plus Noise Ratio (SINR) difference of a first mobile station and a first SINR difference of a second mobile station;
   determining a second SINR difference of the first mobile station and a second SINR difference of the second mobile station;
   selecting a plurality of antenna patterns for each of the first and second base stations which maximizes a channel capacity based on the first and second SINR differences; and
   applying the selected plurality of antenna patterns to the first and second base stations.

26. The method of claim 25, wherein all of the SINR differences are calculated according to corresponding Channel Quality Indicator (CQI) values of the respective mobile stations.

* * * * *